(No Model.)
W. E. HILL.
DIRECT ACTING STEAM ENGINE FOR SAWMILL CARRIAGES.
No. 536,030. Patented Mar. 19, 1895.
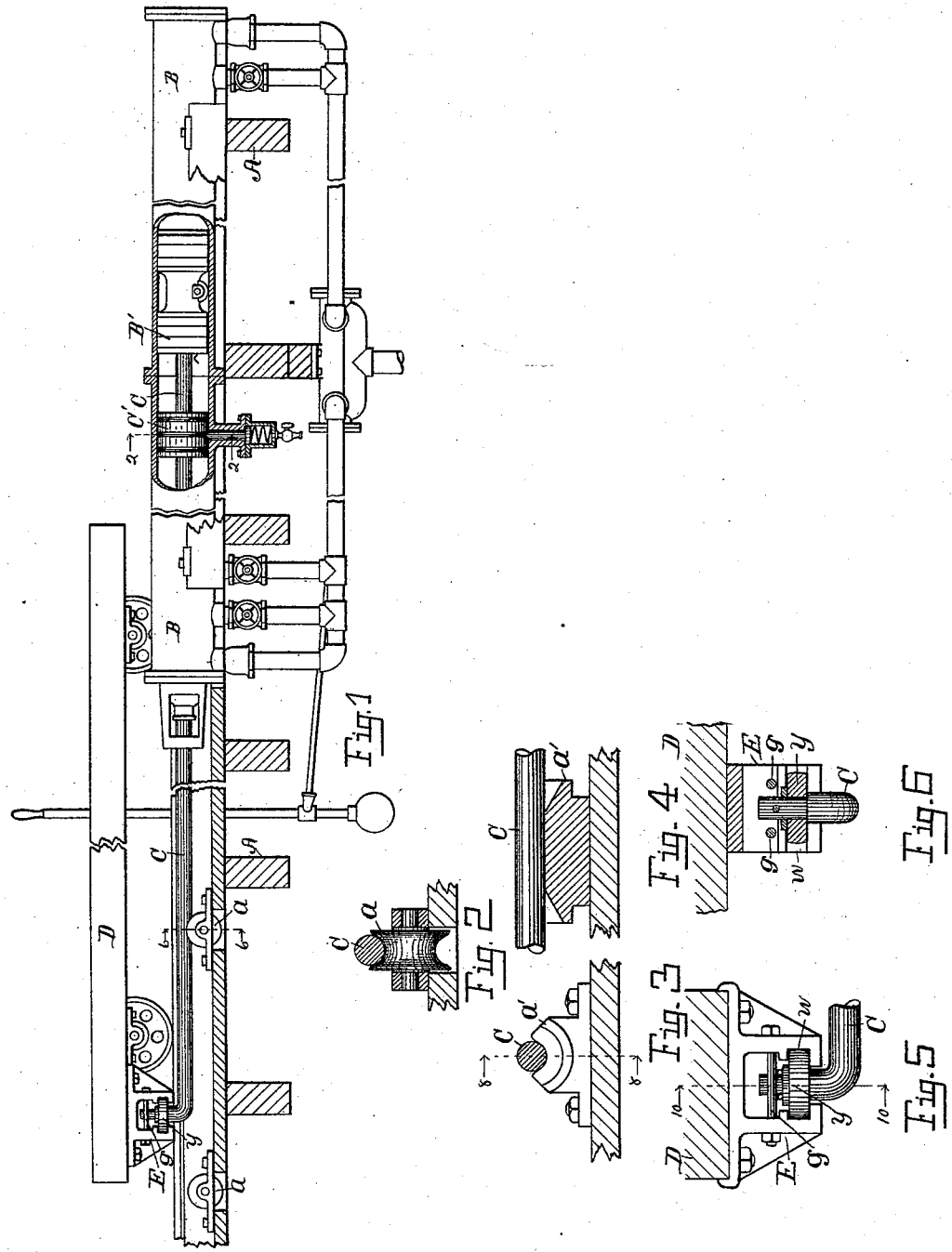
Witnesses:
Walter S. Wood
Evelyne Westbrook
Inventor.
William E. Hill
By Fred L. Chappell
Att'y.

UNITED STATES PATENT OFFICE.

WILLIAM E. HILL, OF KALAMAZOO, MICHIGAN.

DIRECT-ACTING STEAM-ENGINE FOR SAWMILL-CARRIAGES.

SPECIFICATION forming part of Letters Patent No. 536,030, dated March 19, 1895.

Application filed February 13, 1893. Serial No. 462,168. (No model.)

*To all whom it may concern:*

Be it known that I, WILLIAM E. HILL, a citizen of the United States, residing at the city of Kalamazoo, in the county of Kalamazoo and State of Michigan, have invented certain new and useful Improvements in Direct-Acting Steam-Engines for Sawmill-Carriages, of which the following is a specification.

My invention relates to improvements in direct acting steam engines and especially to those having very long cylinders and piston rods which are used to reciprocate saw-mill carriages and for other similar purposes.

The objects of my improvements, are, first to provide a piston rod of such form that it may be attached to the carriage in such a manner that it can be easily guided; second, to provide a means of attaching the piston rod to the carriage in such a manner that slight lateral variations in the carriage will not injuriously affect it, thus permitting the carriage to off set; third, to provide an adjustable attachment for the piston rod to a carriage, and, fourth, to provide suitable guides for the sliding parts of the engine. I accomplish these objects by the mechanism shown in the accompanying drawings, in which—

Figure 1, is a side view of an engine in sections, embodying my improvements. Fig. 2, is a detail of the roller guide and support $a$ outside the cylinder. Figs. 3 and 4 are details of a sliding support for the same purpose. Fig. 5 is an enlarged detail of the bracket E, and the end of the piston rod. Fig. 6 is a view in section of the same on line 10—10 of Fig. 5.

Similar letters of reference refer to similar parts throughout the several views.

A, A, are the floor timbers of a saw-mill which support an engine cylinder B of a steam feed for saw-mills. The piston head B', has a piston rod C, that projects through a stuffing box at the end of the cylinder and is attached by my improved bracket to the reciprocating saw-mill carriage D.

C' represents a cylindrical support for the long piston rod to prevent its sagging, which I have described and claimed prior hereto and which it is unnecessary to further describe here.

The engine B can be operated by any suitable means and as my invention does not pertain to that portion of the mechanism it is not necessary to describe it.

I bend the end of the piston rod C up at right angles to attach it to the carriage by the bracket E. On the vertical portion at the end I place an antifriction roller $y$ which fits in the opposite parallel grooves $w$ in the bracket E. The bolts $g$ pass through both sides of the bracket E and prevent them from being separated and also serve as stops to prevent the piston rod from escaping at the sides. The bolts may be tightened at any time, drawing the two parts of the bracket E together, thus preventing any loss of motion from the parts becoming worn. These bolts $g$ are far enough apart to allow a little lateral play to the piston rod which allows the carriage to be moved a little to one side without moving the piston rod C. This is necessary where the engine is used in connection with an off-setting saw-mill carriage. It also prevents in a measure the piston rod from binding.

The piston rod C when attached to the carriage in the above described manner can be easily supported and guided by the roller $a$ or the guide $a'$. The guide $a'$ is enlarged at each end so that the piston rod C will pass into it easily as is clearly shown in Figs. 3 and 4.

Having thus described my invention, what I claim as new, and desire to secure by Letters Patent, is—

1. The combination, with a saw mill carriage, of a steam cylinder containing a piston head; a piston rod passing out through said cylinder head and upturned at its outer end with a vertical journal on the outer end of said rod; a suitable journal bearing for said journal attached to the saw mill carriage; and suitable guides below said piston rod, for the purpose specified.

2. In a direct acting steam engine of the class described the combination of a piston rod with a lateral projection at the end bearing an antifriction roller and a bracket or case, attached to the carriage to be moved, containing oppositely facing transverse parallel grooves adapted to receive the antifriction roller for the purpose specified.

3. In a direct acting steam engine, the combination of a steam cylinder, containing a piston and piston rod, carrying an antifriction roller on a lateral projection, the roller fitting in oppositely facing transverse adjustable parallel grooves for the purpose specified.

4. In a direct acting steam engine the combination of the piston rod having a lateral projection, an antifriction roller on said projection, and a case attached to the carriage containing oppositely facing transverse walls adapted to said antifriction roller for the purpose specified.

5. The combination, with a sawmill carriage, of a steam cylinder containing a piston head; a piston rod passing out through said cylinder head, with its outer end upturned and vertically, pivotally, and slidingly connected with the carriage; and suitable guides below to support said piston rod, for the purpose specified.

In witness whereof I have hereunto set my hand and seal in the presence of two witnesses.

WILLIAM E. HILL. [L. S.]

Witnesses:
CORA EVELYNE WESTBROOK,
E. S. ROOS.